United States Patent
Li et al.

(10) Patent No.: US 6,620,530 B1
(45) Date of Patent: Sep. 16, 2003

(54) SYNTHETIC ANTI-PARALLEL SPIN VALVE, HAVING IMPROVED ROBUSTNESS, AND PROCESS TO MANUFACTURE IT

(75) Inventors: Min Li, Fremont, CA (US); Cheng T. Horng, San Jose, CA (US); Ru Ying Tong, San Jose, CA (US); Simon H. Liao, Fremont, CA (US); Kochan Ju, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 243 days.

(21) Appl. No.: 09/769,813

(22) Filed: Jan. 26, 2001

(51) Int. Cl.[7] .................................................. G11B 5/60
(52) U.S. Cl. ................................ 428/692; 428/694 TM; 428/694 TS; 428/900; 427/58; 427/123; 427/126.3; 427/126.4; 427/128; 427/130; 427/131; 427/132; 427/404; 427/419.1; 427/419.2; 427/376.1; 360/110; 360/113; 360/122; 360/124; 360/128; 338/32 R; 324/252
(58) Field of Search ........................ 428/694 TM, 900, 428/694 TS, 692; 360/113, 110, 122, 126, 128; 338/32 R; 324/252; 427/123, 126.3, 126.4, 128, 130, 131, 132, 404.1, 419.1, 419.2, 376.1, 58

(56) References Cited

U.S. PATENT DOCUMENTS

| | | | | |
|---|---|---|---|---|
| 5,408,377 A | * | 4/1995 | Gurney et al. | 360/113 |
| 5,751,521 A | | 5/1998 | Gill | 360/113 |
| 5,856,897 A | * | 1/1999 | Mauri | 360/113 |
| 6,134,090 A | | 10/2000 | Mao et al. | 360/324.1 |
| 6,364,961 B1 | * | 4/2002 | Nagasaka et al. | 148/108 |
| 6,388,847 B1 | * | 5/2002 | Horng et al. | 360/324.14 |
| 6,517,896 B1 | * | 2/2003 | Horng et al. | 427/123 |
| 6,522,507 B1 | * | 2/2003 | Horng et al. | 360/324.12 |

OTHER PUBLICATIONS

S. Mao et al., "Ni Mn–Pinned Spin Valves With High Pinning Field Made by Ion Beam Sputtering", Appl. Phys. Lett 69(23) (1996) 3593.
H. Kishi et al., "Study of Exchange–Coupled Bias Field in NiFePdPtMn Thin Films", IEEE Trans. Magnetics V32(5) (1996) 3380.
M. Saito et al., "PtMn Single and Dual Spin Valves With Synthetic Ferrimagnet Pinned Layers", J. Appl. Phys. V85(8) (1999) 4928.
M. Saito et al., "PtMn Spin Valve with Synthetic Ferrimagnet Free and Pinned Layers", J. Appl. Phys. 87 (2000) 6974.

* cited by examiner

Primary Examiner—Leszek Kiliman
(74) Attorney, Agent, or Firm—George O. Saile; Stephen B. Ackerman

(57) ABSTRACT

A spin valve structure and a method for manufacturing it are described. The spin valve uses a modified pinned layer that consists of two cobalt iron layers separated by a layer of either ruthenium, iridium, or rhodium. A key feature of the invention is that this spacer layer is significantly thinner (typically 3–4 Angstroms) than similar layers in prior art structures. Normally, when such thin spacer layers are used, annealing fields in excess of 20,000 Oersted are needed to cause the two cobalt iron layers to become antiparallel. The present invention, however, teaches that much lower annealing fields (spanning a limited range) may be used with equal effect. The result is that a very high internal pinning field is created giving devices of this type greater pinned layer stability and reduced pinning reversal. These devices also exhibits a minimum amount of open looping in their hysteresis curves.

13 Claims, 6 Drawing Sheets

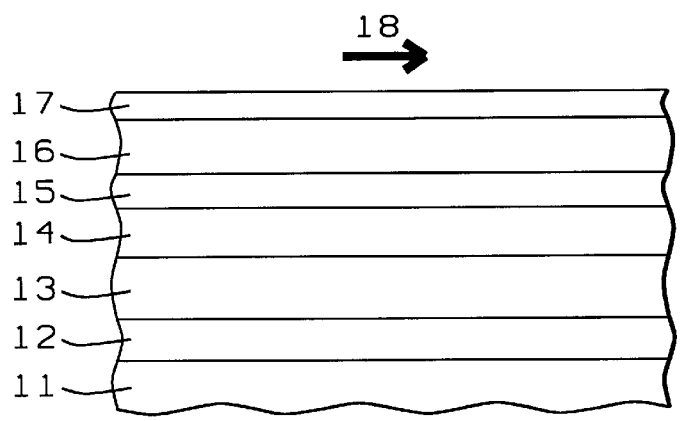
FIG. 1 - Prior Art
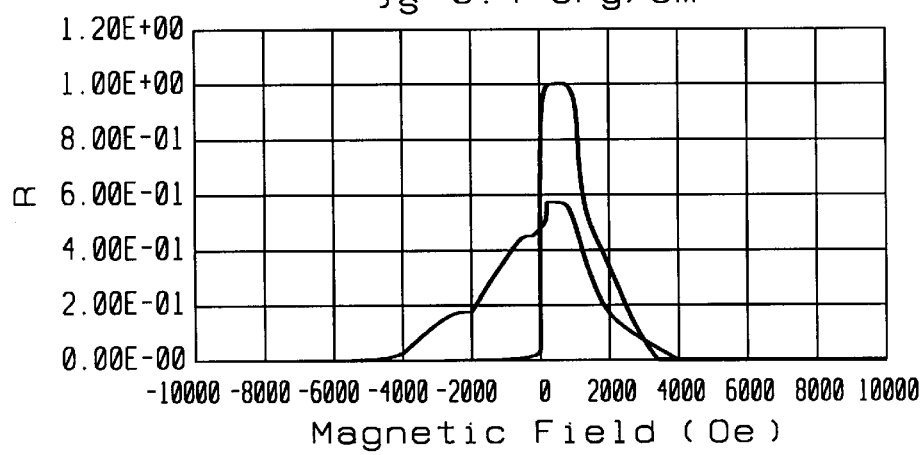
FIG. 2a
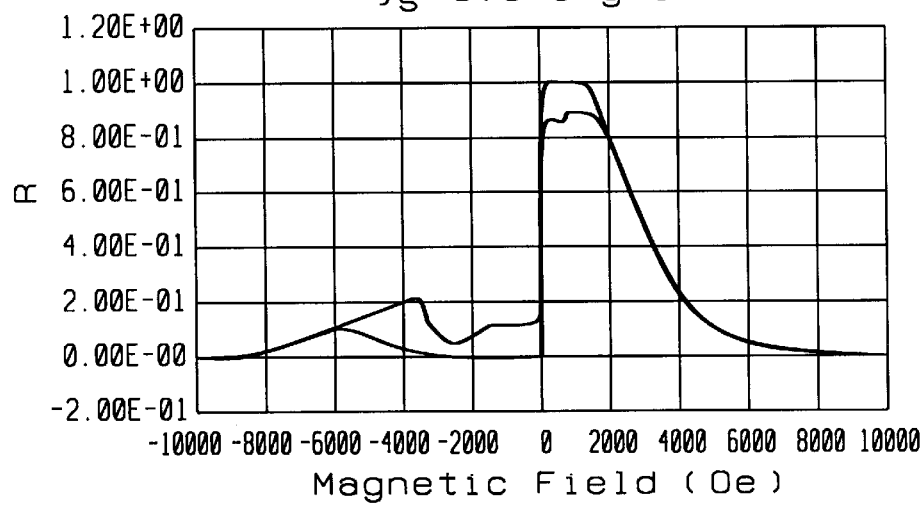
FIG. 2b

SYNTHETIC ANTI-PARALLEL SPIN VALVE, HAVING IMPROVED ROBUSTNESS, AND PROCESS TO MANUFACTURE IT

FIELD OF THE INVENTION

The invention relates to the general field of magnetic disk systems with particular reference to GMR based read heads and the stability of pinned layers therein.

BACKGROUND OF THE INVENTION

The principle governing the operation of magnetic read heads is the change of resistivity of certain materials in the presence of a magnetic field (magneto-resistance). In particular, most magnetic materials exhibit anisotropic behavior in that they have a preferred direction along which they are most easily magnetized (known as the easy axis). The magneto-resistance effect manifests itself as an increase in resistivity when the material is magnetized in a direction perpendicular to the easy axis, said increase being reduced to zero when magnetization is along the easy axis. Thus, any magnetic field that changes the direction of magnetization in a magneto-resistive material can be detected as a change in resistance.

The magneto-resistance effect can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are shown in FIG. 1. In addition to a seed layer 12 on a substrate 11 and a topmost cap layer 17, the key elements are two magnetic layers 13 and 15, separated by a non-magnetic layer 14. The thickness of layer 14 is chosen so that layers 13 and 15 are sufficiently far apart for exchange effects to be negligible (the layers do not influence each other's magnetic behavior at the atomic level) but are close enough to be within the mean free path of conduction electrons in the material.

If, now, layers 13 and 15 are magnetized in opposite directions and a current is passed though them along the direction of magnetization (such as direction 18 in the figure), half the electrons in each layer will be subject to increased scattering while half will be unaffected (to a first approximation). Furthermore, only the unaffected electrons will have mean free paths long enough for them to have a high probability of crossing over from 13 to 15 (or vice versa). However, once these electron 'switch sides', they are immediately subject to increased scattering, thereby becoming unlikely to return to their original side, the overall result being a significant increase in the resistance of the entire structure.

In order to make use of the GMR effect, the direction of magnetization of one the layers 13 and 15 is permanently fixed, or pinned. In FIG. 1 it is layer 15 that is pinned. Pinning is achieved by first magnetizing the layer (by depositing and/or annealing it in the presence of a magnetic field) and then permanently maintaining the magnetization by over coating with a layer of antiferromagnetic material, or AFM, (layer 16 in the figure). Layer 13, by contrast, is a "free layer" whose direction of magnetization can be readily changed by an external field (such as that associated with a bit at the surface of a magnetic disk).

The structure shown in FIG. 1 is referred to as a top spin valve because the pinned layer is at the top. It is also possible to form a 'bottom spin valve' structure where the pinned layer is deposited first (immediately after the seed and pinning layers). In that case the cap layer would, of course, be over the free layer.

As discussed above, the pinned layer (typically CoFe or similar ferromagnetic material) in the spin valve structures has to be exchange-biased by an AFM material. When pinned by MnPt or NiMn (AFM materials with high blocking temperature), the pinned layers usually display large anisotropy. The anisotropy field, Hck, is comparable to the pinning field Hpin, both these parameters being distributed over a range of values. These features result in pinned layer loop open and instability. This problem is more severe for the NiCr or NiFeCr seeded SVs in comparison to Ta seeded SVs.

It is also known that SVs made of a synthetic anti-parallel pinned layer (SyAP) can significantly reduce the loop open in the pinned layer. The pinning strength of a SyAP SV is much higher than that of the regular single SV. Typically, the device contains two anti-parallel layers AP1 and AP2 (AP2 being the layer closest to the AFM). These two layers are then coupled together through a layer of Ru and rotate coherently. This causes the Hck effect from AP2 to be greatly reduced. While this approach is a definite improvement on the state of the art, the devices tend to exhibit loop opens (hysteresis) and are susceptible to damage from soft ESD (electrostatic discharges).

It is possible for a device to be subjected to an ESD event during manufacturing. During such an event, the sensor temperature rises and there is also an induced magnetic field acting on the pinned layer, due to the large ESD current which is often as high as 10–50 mA. ESD damage can be categorized as:

a. Excessive temperature rise during the ESD event—the head resistance increases and is permanently damaged due to inter-diffusion and cannot be recovered. We refer to this as "hard" ESD b. The temperature rise is too low for significant inter-diffusion to occur and head resistance does not increase. However, the ESD induced magnetic field may be counter to the pinned layer magnetization and cause pinned layer magnetization rotation, resulting in signal loss, scattering of device properties etc. For most of these cases, it is possible to recover layer rotation. We refer to this as "soft" ESD. A key aspect of this problem is that if there is no loop open in the R-H curves, "soft" ESD will cause less damage to the head.

A routine search of the prior art was conducted. The following publications of interest were found:

1. S. Mao et al, "NiMn-pinned spin valves with high pinning field made by ion beam deposition" Appl. Phys. Lett 69(23)(1996)3593.
2. H. Kishi et al, "Study of exchange-coupled bias field in NiFe/PdPtMn thin films" IEEE Trans. Magnetics. V32(5) (1996)3380
3. M. Saito et al, "PtMn single and dual spin valves with synthetic ferrimagnet pinned layers", J. Appl. Phys. V85 (8)(1999)4928
4. M. Saito et al, "PtMn spin valve with synthic ferrimagnet free and pinned layers" J. Appl. Phys. 87(2000)6974
5. C. Horng et al."Low field annealing for the spin valves biased by synthetic antiferromagnets". Application Ser. No. 09/458,727, filed Dec. 13, 1999.

And the following patent references of interest:
U.S. Pat. No. 5,751,521 (Gill) shows a synthetic ferrimagnetic layers (e.g., Ru spacer). U.S. Pat. No. 5,856,897

(Mauri; shows a dual SV sensor with Ru spacers. U.S. Pat. No. 5, 408,377 (Gurney et al. and U.S. Pat. No. 6,134,090 (Mao et al.) show related sensors.

SUMMARY OF THE INVENTION

It has been an object of the present invention to provide a spin valve structure that has greater pinned layer stability and reduced pinning reversal relative to similar devices of the prior art.

A further object of the present invention to provide a spin valve structure that exhibits a minimum amount of loop opening in its hysteresis curve.

Another object of the invention has been to provide a spin valve that is highly suitable for use in high density recording.

Still another object of the invention has been to provide a process for the manufacture of said spin valve and pinned layer.

These objects have been achieved by a using a modified pinned layer that consists of two cobalt iron layers separated by a layer of ruthenium, iridium, or rhodium. A key feature of the invention is that this spacer layer is significantly thinner (typically 3–4 Angstroms) than similar layers in prior art structures. Normally, when such thin spacer layers are used, annealing fields in excess of 20,000 Oersted are needed to cause the two cobalt iron layers to become antiparallel. The present invention, however, teaches that much lower annealing fields (spanning a limited range) may be used with equal effect. The result is that a very high internal pinning field is created giving devices of this type greater pinned layer stability and reduced pinning reversal. These devices also exhibits a minimum amount of open looping in their hysteresis curves.

BRIEF DESCRIPTION OF THE DRAWINGS

FIG. 1 is a cross-section of a spin valve structure formed according to the teachings of the prior art.

DESCRIPTION OF THE PREFERRED EMBODIMENTS

Figure 2C:
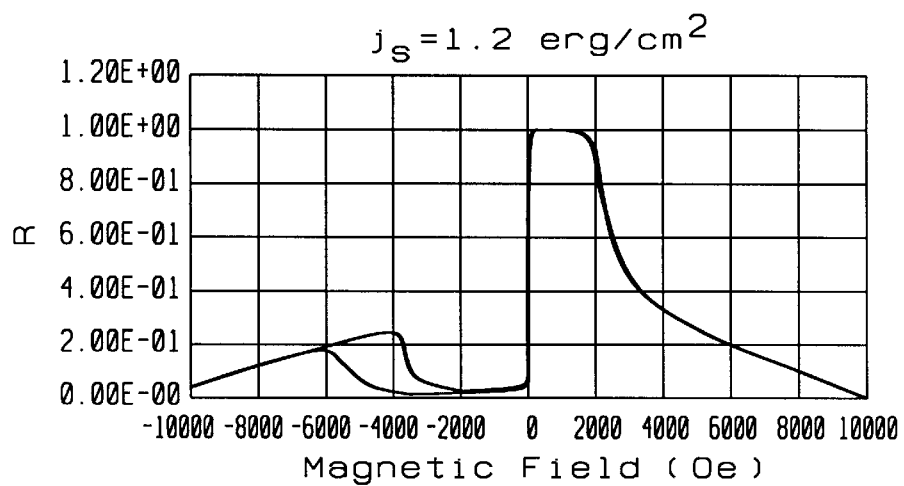
FIG. 2 compares the effect on the R-H curve of a spin valve for several different values of the exchange energy in an anti-parallel layer configuration.

It is known that SyAP spin valve sensors may have loop open (hysteresis) in R-H loops, especially, when the AFM materials are NiMn, MnPdPt, or MnPt. R here is the resistance in ohms of the device. As noted earlier, the loop open is related to sensor instability under field excitation and "soft" ESD damage. We have found, through simulation, and confirmed by experiment, that the hysteresis or the sensor stability can be significantly improved if the exchange coupling strength between AP1/AP2 can be increased. FIGS. 2a–c show simulated R-H loops for devices having the same AP1/AP2 thickness for three different exchange energies. The R-H curves of samples with large Js (FIG. 2c) show much less loop open than those with smaller Js.

Figure 3:
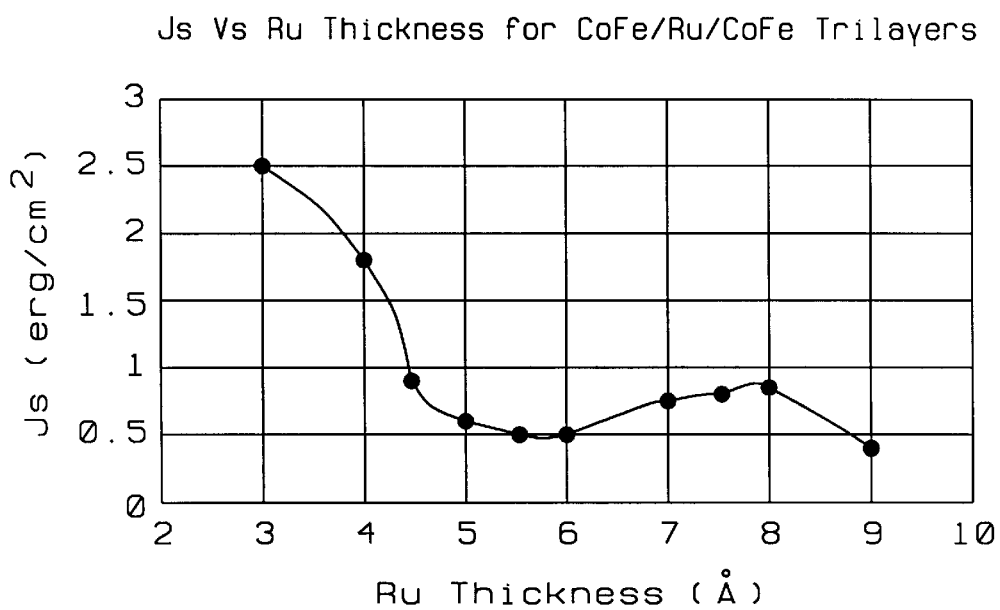
FIG. 3 is a plot of exchange energy as a function of ruthenium layer thickness.

It has been found that ultra thin Ru, Rh, or Ir, when used as nonmagnetic spacers, results in higher exchange coupling energy Js than for the 7.5 Å spacing currently practiced for Ru. As an example, Js as a function of the Ru thickness is plotted in FIG. 3. It can be seen that a Ru spacer of 3–4 Å gives much higher Js than Ru 7.5 Å. The saturation field (Hs) for a SyAP structure with Ru7.5 that was annealed at a temperature of 250–280° C. is around 6–7 kOe. The SyAP SV is fully annealed to its antiparallel (AP) state by a 10 kOe field annealing. Hs for the 3–4 A Ru SyAP is around 20–25 kOe and is even higher for Rh, Ir cases.

Prior work has indicated that it is necessary to anneal this type of SyAP SV at very high fields (>20 kOe) in order to cause AP1 and AP2 to be anti-parallel to one another. This is not practical for application to manufacturing (i.e. wafer production) so use in practical devices had previously not been contemplated. In the course of work leading up the present invention it was established that lower fields, in a limited specific range, could actually be used.

Figure 4A:
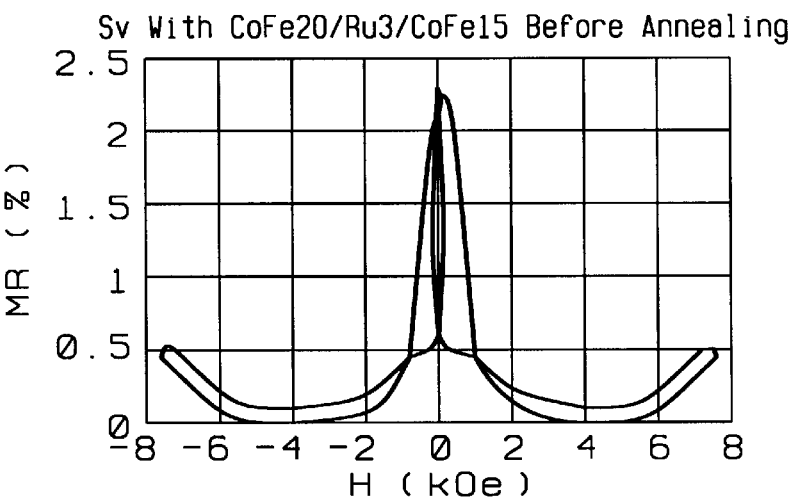
FIGS. 4a and 4b are R-H plots for SV structures before and after annealing.
Figure 4B:
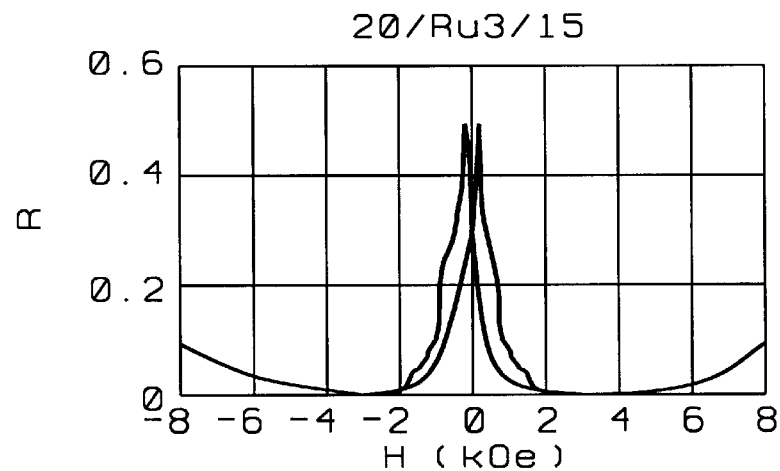
Figure 4C:
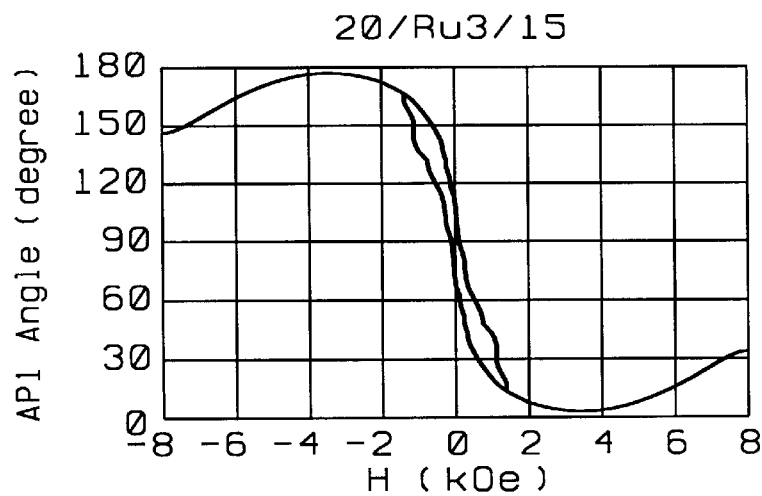
FIGS. 4c and 4d compare angles of the two antiparallel layers as a function of applied field.
Figure 4D:
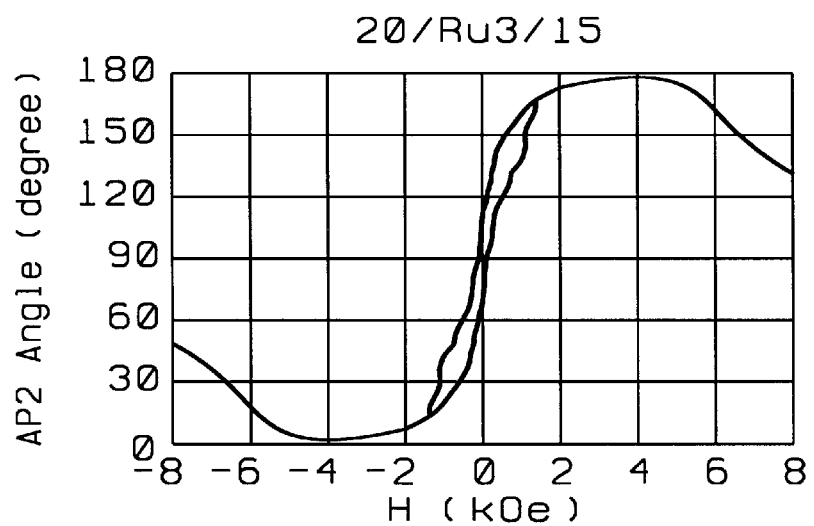

FIG. 4a shows the R-H curves of as-deposited SyAP SVs with Ru3 Å, measured at room temperature. From these R-H curves, one can see that there is a limited low field flat region where the resistance of the SV is at its lowest. This low field flat region was identified as corresponding to the antiparallel state of AP1 and AP2's magnetization, which meant that the SyAP SV could be annealed within this limited range. FIGS. 4b, c, and d show calculated R-H curves and AP1/AP2 angles (the angle between Ap1/AP2 magnetization and the applied field directions) for as-deposited SyAP SV with Ru at 3 Å. The simulation has been found to agree well with experiment. This confirmed that, in the low field flat region, AP1 and AP2 are in fact antiparallel to each other so that the SyAP SV can be magnetically set in this low field region.

Further simulation also showed that the low field flat region depends on the thickness of AP1/AP2, delta of AP1/AP2 and Js. Smaller AP1/AP2 thickness, larger AP1/AP2 delta, and larger Js, all increase the low field flat region. The use of Ru3–4, Rh, or Ir, as disclosed in the present invention, with larger Js, increases the low field flat region and makes possible low field annealing. The high temperature annealing field is estimated from the room temperature R-H curves in FIG. 4a by taking into account the decrease of the Js and magnetizations of AP1 and AP2 and was verified experimentally.

By increasing the Js of AP1/AP2, the signal level from the head can be improved since AP1/AP2 is pinned more strongly in the vertical direction. Because of this, the linear dynamic range can be extended.

It is also known that magnetic structures with Rh or Ir spacers have even higher Js between AP1/AP2 than those with Ru as a spacer. Thus, a SyAP SV with Rh or Ir as a nonmagnetic spacer between AP1/AP2 can also reduce the SyAP spin valve instability and improve the performance of the heads. The Rh, Ir SyAP structures can also be annealed in low fields for the same reasons as those outlined above for Ru. Since Js is higher for Rh, Ir than thin Ru, the low field annealing window is wider than for thin Ru samples with the same AP1/AP2 thickness.

We now provide a description of a process for manufacturing the spin valve of the present invention. It is important to note that, since the exchange forces that determine the behavior of structures such as spin valves operate over very short distances, the various thicknesses specified in the claims are critical, as opposed to optimal. A structure having the same sequence of layers, but one or more thicknesses outside the claimed ranges, will have different characteristics from the structures disclosed by the present invention.

Figure 5:
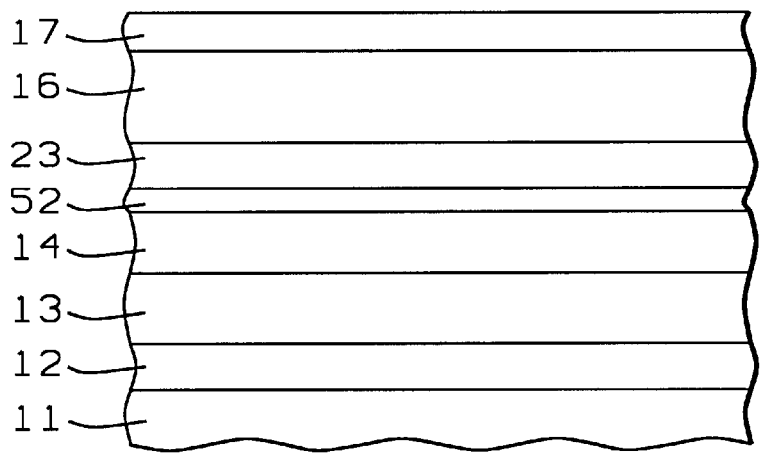
FIG. 5 is a cross-section of a spin valve structure formed according to the teachings of the present invention

The process begins with the provision of suitable substrate 11 (as seen in FIG. 5). Examples of suitable substrate materials include aluminum oxide and silicon oxide. Next, seed layer 12 of NiCr (nickel-chromium) is deposited onto substrate 11. This magneto-resistance enhancing layer has a thickness between about 45 and 60 Angstroms and a composition of between about 55 and 65 atomic % nickel. Layer 12, as well as all subsequent layers, was deposited by means of DC-magnetron sputtering. The use of this material (instead of, for example, tantalum) is essential if the structure is to exhibit specular reflection at the interfaces.

The next layer to be laid down is free layer 13. This is a composite layer of cobalt-iron and nickel-iron: NiFe(10–30 Å)/CoFe(5–15 Å) having a composition of between about 77 and 83 atomic % Ni (in the NiFe) and between about 85 and 90 atomic % Co (in the CoFe).

Non-magnetic layer 14, typically copper between about 16 and 25 Angstroms thick, is then deposited over free layer 13. On the non-magnetic layer 14 is deposited layer 21 of cobalt-iron (CoFe) between about 15 and 30 Angstroms thick with 20 Angstroms being preferred. This corresponds to AP1. This is followed by ruthenium spacer layer 52, which, as a key feature of the invention, is between about 2.5 and 4 Angstroms thick, with 3 Angstroms being preferred.

Layer 23 corresponds to AP2 and is CoFe deposited onto ruthenium layer 52 to a thickness between about 15 and 30 Angstroms, with 15 Angstroms being preferred. The deposition phase of the process concludes with the deposition of MnPt layer 16 onto layer 23, to a thickness between about 70 and 200 Angstroms, with 120 Angstroms being preferred, followed with the deposition of NiCr capping layer 17 to a thickness between about 20 and 40 Angstroms, with 30 Angstroms being preferred.

Then, in another key feature of the invention, the structure is annealed in a magnetic field between about 1,500 and 2,500 oersted at a temperature between about 250 and 280° C. for between about 5 and 8 hours.

In alternative embodiments of the invention, the ruthenium in layer 52 is replaced by iridium or rhodium with the iridium being between about 2.5 and 4 Angstroms thick and the rhodium being between about 4 and 6 Angstroms thick. Annealing for these configurations was in a magnetic field between about 1,000 and 3,000 oersted at a temperature between about 250 and 280° C. for between about 5 and 8 hours for iridium and in a magnetic field between about 2,000 and 4,000 oersted at a temperature between about 250 and 280° C. for between about 5 and 8 hours for rhodium.

Experiments Done to Confirm Performance of Invention

Figure 6A:
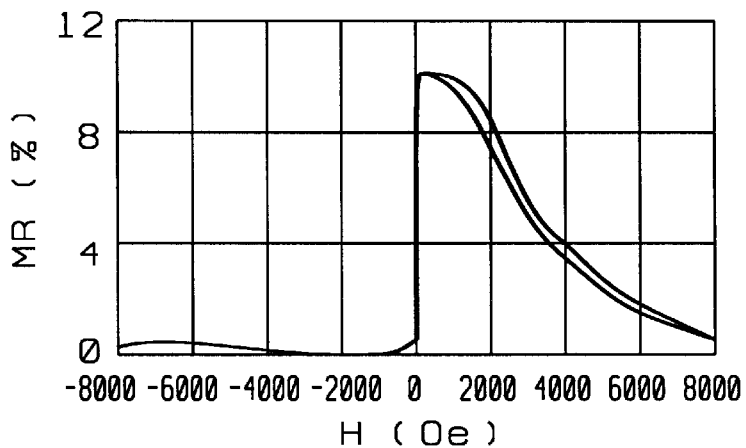
FIGS. 6a to 6c show R-H curves for devices having 7.5 Angstroms of ruthenium when measured at room temperature, 150° C., and 250° C. respectively.
Figure 6B:
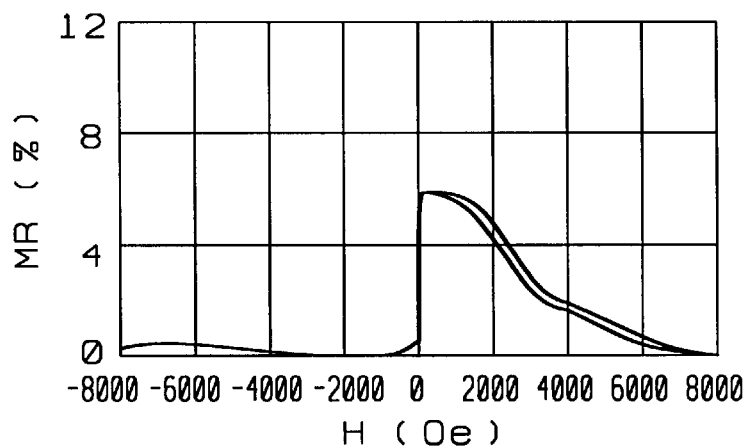
Figure 6C:
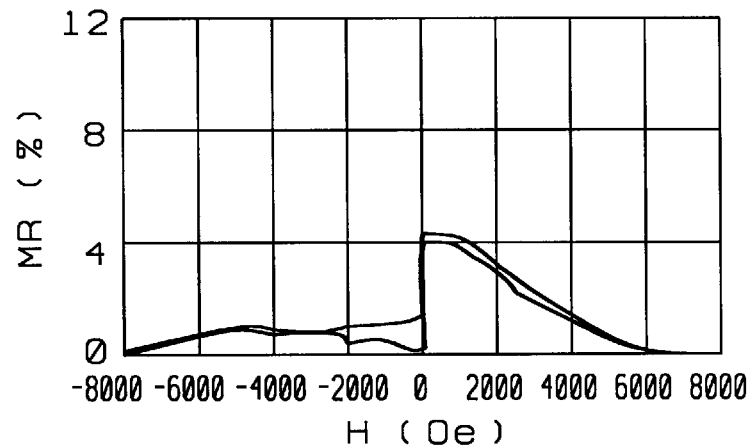
Figure 7A:
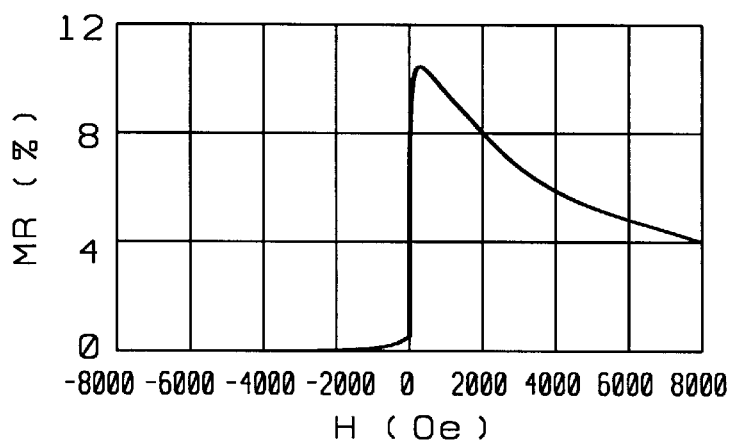
FIGS. 7a to 7c show R-H curves for devices having 3.0 Angstroms of ruthenium when measured at room temperature, 150° C., and 250° C. respectively.
Figure 7B:
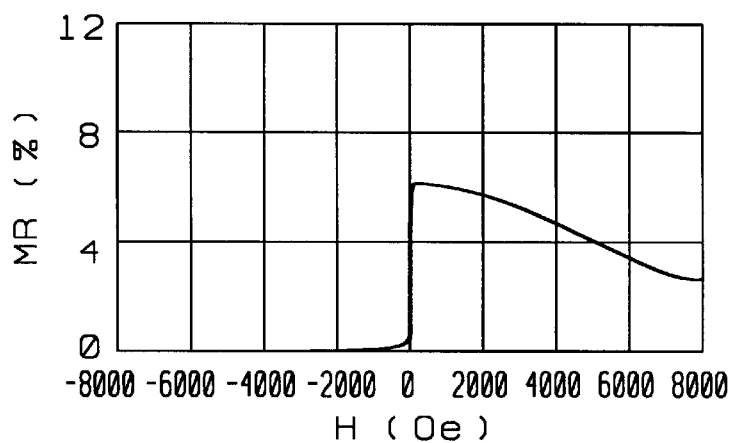
Figure 7C:
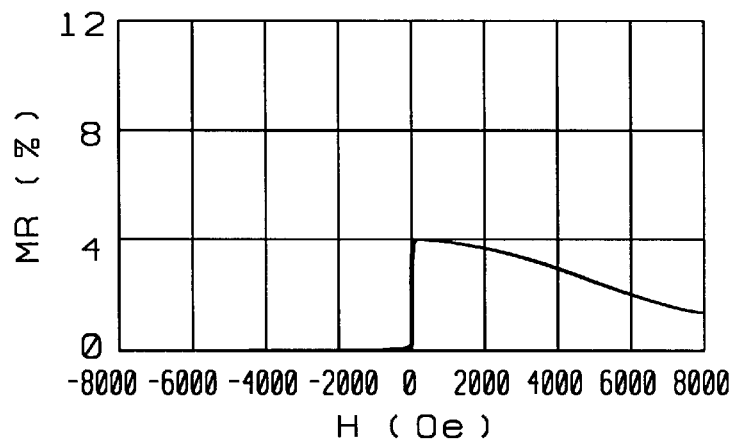

SyAP configurations of NiCr/NiFe/CoFe/Cu/CoFe/Ru/CoFe/MnPt/NiCr were used to verify the simulated results. Sample A: CoFe20/Ru7.5/CoFe15 was annealed in 10 kOe oven and sample B: CoFe20/Ru3/CoFe15 was annealed in low field 2 kOe. A ±200 Oe annealing field window was found for sample B configuration. FIGS. 6a–c shows the CoFe20/Ru7.5/CoFe15 sample's R-H curves, measured at room temperature, 150° C., and 250° C. respectively, while FIGS. 7a–c shows that of the CoFe20/Ru3/CoFe15 sample (measured at the same three temperatures).

It is seen that the Ru3 sample has much better R-H curves than the Ru7.5 sample and that loop open was significantly reduced in comparison with sample A. The Ru3 sample has a hysteresis-free R-H curve and a very high internal pinning field (6,000 Oe) even at temperature as high as 250° C. With this kind of hysteresis-free R-H curves, pinned layer related instability, pinning reversal and "soft ESD", etc can all be reduced.

While the invention has been particularly shown and described with reference to the preferred-embodiments thereof, it will be understood by those skilled in the art that various changes in form and details may be made without departing from the spirit and scope of the invention.

What is claimed is:

1. A process for forming a magnetically pinned layer, comprising:

providing a partially formed spin valve, including a non-magnetic layer on a magnetically free layer;

on said non-magnetic layer, depositing a first magnetic layer;

on said first magnetic layer, depositing a spacer layer to a thickness that is less than 6 Angstroms;

on the spacer layer, depositing a second magnetic layer;

on the second magnetic layer depositing a pinning layer and then a capping layer; and then annealing all layers in a magnetic field that is less than about 5,000 oersted at a temperature less than 280° C., whereby said first and second magnetic layers become aligned relative to one another in a magnetically antiparallel configuration and a very high internal pinning field is generated.

2. The process of claim 1, wherein the spacer layer is ruthenium deposited to a thickness between about 2.5 and 4 Angstroms and the step of annealing all layers further comprises heating in a magnetic field of between about 1,500 and 2,500 oersted at a temperature between about 250 and 280° C. for between about 5 and 8 hours.

3. The process of claim 1 wherein the spacer layer is iridium deposited to a thickness between about 2.5 and 6 Angstroms and the step of annealing all layers further comprises heating in a magnetic field of between about 1,000 and 3,000 oersted at a temperature between about 250 and 280° C. for between about 5 and 8 hours.

4. The process of claim 1 wherein the spacer layer is rhodium deposited to a thickness between about 4 and 6 Angstroms and the step of annealing all layers further comprises heating in a magnetic field of between about 2,000 and 4,000 oersted at a temperature between about 250 and 280° C. for between about 5 and 8 hours.

5. The process of claim 1 wherein said very high internal pinning field is between about 5,000 and 8,000 oersted.

6. A process for manufacturing a spin valve structure, comprising the sequential steps of:

providing a substrate and depositing thereon a NiCr seed layer;

on said seed layer, depositing a free layer of a first layer of cobalt-iron and then depositing a layer of copper on the free layer;

on the copper layer depositing a second layer of cobalt-iron between about 15 and 25 Angstroms thick;

depositing on the second layer of cobalt-iron a spacer layer that is less than about 6 Angstroms thick;

on the spacer layer, depositing a third cobalt-iron layer to a thickness between about 15 and 25 Angstroms;

on the third cobalt-iron depositing a layer of manganese platinum followed by the deposition on the manganese platinum layer of a NiCr capping layer; and annealing all layers in a magnetic field that is less than about 5,000 oersted at a temperature less than 280° C., whereby said second and third layers of cobalt iron become aligned relative to one another in a magnetically anti-parallel configuration and an internal pinning field is generated.

7. The process of claim 6 wherein the spacer layer is ruthenium deposited to a thickness between about 2.5 and 4 Angstroms and the step of annealing all layers further comprises heating in a magnetic field of between about 1,500 and 2,500 oersted at a temperature between about 250 and 280° C. for between about 5 and 8 hours.

8. The process of claim 6 wherein the spacer layer is iridium deposited to a thickness between about 2.5 and 4 Angstroms and the step of annealing all layers further comprises heating in a magnetic field of between about 1,000 and 3,000 oersted at a temperature between about 250 and 280° C. for between about 5 and 8 hours.

9. The process of claim 6 wherein the spacer layer is rhodium deposited to a thickness between about 4 and 6 Angstroms and the step of annealing all layers further comprises heating in a magnetic field of between about 2,000 and 4,000 oersted at a temperature between about 250 and 280° C. for between about 5 and 8 hours.

10. The process described in claim 6 wherein said layers of cobalt-iron contain between about 85 and 95 atomic % cobalt.

11. The process described in claim 6 wherein said layers of NiCr contain between about 55 and 65 atomic % nickel.

12. The process described in claim 6 wherein said manganese platinum layer is deposited to a thickness between about 70 and 250 Angstroms.

13. The process described in claim 6 wherein said manganese platinum layer contain between about 50 and 60 atomic % manganese.

* * * * *